G. E. SEIDEL.
VEHICLE DOOR.
APPLICATION FILED AUG. 27, 1908.
918,204.
Patented Apr. 13, 1909.
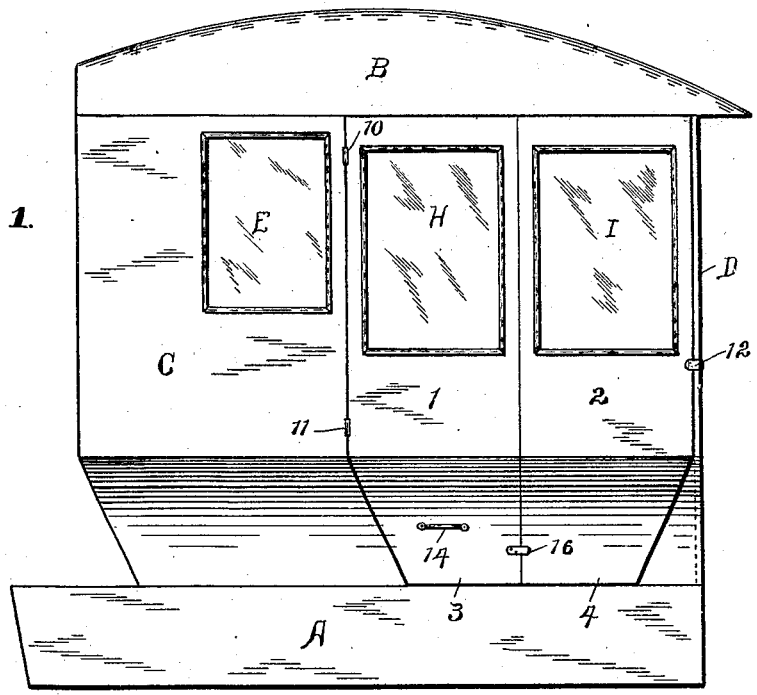
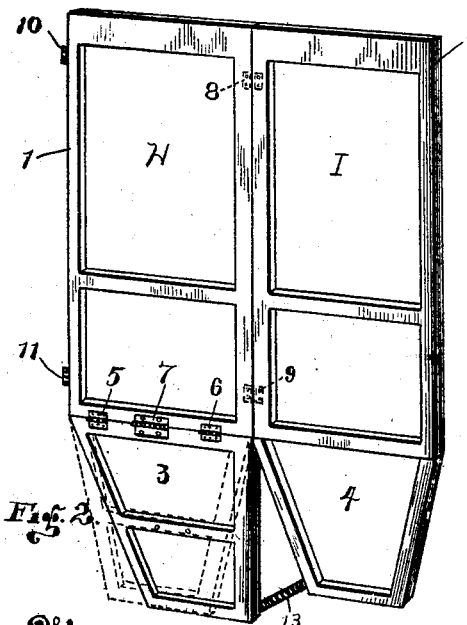
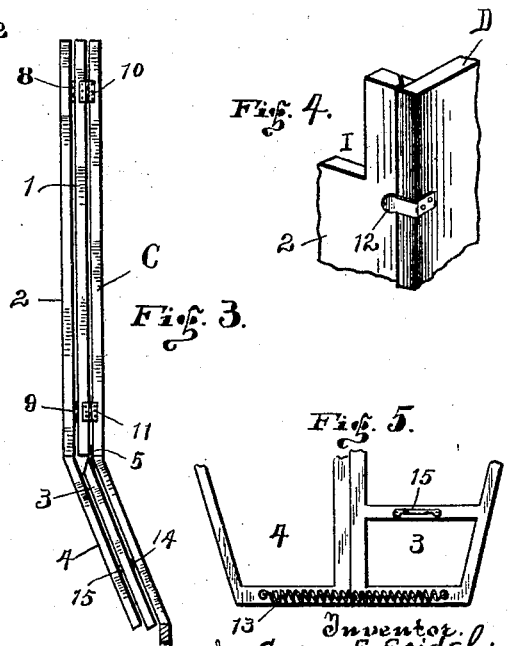
Witnesses:
Adelaide Kearns.
R. Lue Kearns.
Inventor.
George E. Seidel;
By Robert W. Randle
Attorney.

UNITED STATES PATENT OFFICE.

GEORGE E. SEIDEL, OF RICHMOND, INDIANA.

VEHICLE-DOOR.

No. 918,204.  Specification of Letters Patent.  Patented April 13, 1909.

Application filed August 27, 1908. Serial No. 450,440.

*To all whom it may concern:*

Be it known that I, GEORGE E. SEIDEL, a citizen of the United States, residing in the city of Richmond, in the county of Wayne and State of Indiana, have invented certain new and useful Improvements in Vehicle-Doors, of which the following is a full, clear, and comprehensive specification and exposition, being such as will enable others to make and use the same with absolute exactitude.

My present invention relates to folding doors for vehicles or the like, such for instance as buggies, carriages, automobiles and delivery-wagons, and it is intended, particularly, for closing the side openings of such vehicles with which it may be used.

The object of my invention, broadly speaking, is to provide a foldable vehicle door which will be neat and attractive in appearance, strong and durable in construction, easily operated and controlled, positive in action, and which can be manufactured and sold at a comparatively small additional cost to the vehicle.

More particularly stated, my object is to provide a folding side-door for vehicles of irregular vertical contour, said door having its members hinged together and hinged to the side of the door opening, and adapted to fold back against the side of the vehicle with the members of the door nested together, and also having means whereby, when closed, the members of the door will be locked in position with relation to the door opening and with each other.

Other objects and particular advantages of the invention will be made apparent in the course of the following specification.

One manner of carrying out the principles of my invention, and that which in practice I have determined to be the most practical, is shown in the accompanying drawings, in which—

Figure 1 is a side elevation of a portion of a vehicle, showing my invention attached thereto and in position to close one of the side door-openings. Fig. 2 is a perspective view of the frame-work of my invention, showing the first movement accomplished in folding the members of the door. Fig. 3 is an edge view of my invention folded, showing the members nested together. Fig. 4 is an isometrical detail showing the connection and means for securing the free edge of the door in operative position. And Fig. 5 is a detail view of the inner face of the lower portion of the door.

Similar indices denote like parts throughout the several views.

In order that the principles of my invention may be more fully understood and appreciated I will now take up a description thereof, in which I will set forth the construction and operation of the invention as briefly and as comprehensively as I may.

In this instance the letter A denotes a vehicle body, of which the letter B denotes the top, the letter C denotes the side, the letter D denotes one of the front corners, a front post, or the edge of the front as the case may be. An opening of the usual form is located between the forward edge of the side C and the post or corner D which opening extends down convergently into the body A in the usual manner. The upper portion of the sides of the body A extend downward and inward at an angle, as is usual in such cases. A window E is located in the side C in any well known manner.

I desire that it be understood that my invention is not limited to the particular construction of vehicle shown, the above specified construction being shown simply to illustrate the operation and application of my invention.

My invention comprises two sections, 1 and 2, formed preferably of substantially equal dimensions, each having a downwardly extending projection, 3 and 4 respectively, which extend inward at an angle equal to the inwardly projecting angle of the body of the vehicle, said sections and their projections together being of a size such as to fit said opening in the side of the vehicle and having a vertical contour corresponding thereto. In each of the sections 1 and 2 is formed a window H and I, respectively.

The sections 1 and 2, and their extensions 3 and 4, may be formed in a variety of ways, but in practice I prefer to form them frame-like, substantially as shown in Fig. 2, and then to cover each frame with the usual vehicle upholstering and trimming, which will match the upholstering and trimming of the vehicle on which my invention is used.

The extension 4 of the section 2 is rigidly connected or is integral therewith and is disposed at an angle with relation thereto.

The extension 3 corresponds in contour, normally, to the extension 4, but it is hinged to the lower end of the section 1 by means of the hinges 5 and 6 and also by the spring-hinge 7 located therebetween. All of said hinges being located on the outer face of the section 1 and its extension 3, all substantially as indicated in Fig. 2. The upper edge of section 3 is beveled from its outer face rearward and downward, as indicated in Fig. 3, whereby it will fit the lower edge of section 1 when it swings inward to close the vehicle as shown in Fig. 1. The action of the spring-hinge 7 is such as to normally cause the extension 3 to project back or inward at same angle as the extension 4.

The sections 1 and 2 are hinged together by hinges 8 and 9 located on the inner faces of the sections as indicated in the drawings. Section 1 is hinged to the forward edge of the side C by the hinges 10 and 11.

From the above it is apparent that the section 1 may be turned, on the hinges 10 and 11, back parallel with and against the outside of the side C, and at same time the section 2 may be turned, on the hinges 8 and 9, to position parallel with and in contact with the section 1, by which the inside faces of the sections 1 and 2 are contacted with each other, thereby protecting the inside upholstering of the door.

The operation of folding the sections and their extensions whereby they will nest together and fit the side of the vehicle is made possible by reason of the hinged extension 3, by which as the sections are folded together the rigid extension 4 turns or presses out the extension 3 to the position shown in Fig. 3, yet allowing the extensions 3 to turn back in alinement with the section 4 when the sections are opened out as in Fig. 1.

The numeral 12 denotes a rigid clip or the like secured to the post or front D and extending back to lap over the edge of the section 2 when the door is closed, as in Figs. 1 and 4. A plurality of clips 12 may be provided, or in place thereof a channel may be formed in the rear face of the post D in which the front edge of the door may enter.

If desired, as a precautionary measure, a helical spring 13 may be employed to insure a positive and quick operation of the extension 3, and of the sections with relation to each other. Said spring is secured at one end to the inner face of the extension 3 and its other end is secured to the inner face of the extension 4. Said points of securing being located some distance apart and such as to give the proper tension to the spring for its successful operation, this construction being shown most clearly in Fig. 5.

A handle 14 is attached to the outer face of the extension 3, and a similar handle 15 is attached to the inner face of said extension, to assist in the manipulations of the door.

A lug 16 may be attached to the outer face of the extension 3 and projects over the edge thereof to engage the outer face of the extension 4, as shown in Fig. 1, for the purpose of preventing the extension 3 from being pressed inward farther than in alinement with the extension 4.

The manipulation of my invention is quite simple: Suppose for instance that the device be unfolded and in operative position closing a side opening in the vehicle, substantially as in Fig. 1. In this position it will be noticed that the invention can not be swung outward, by reason of the clip 12 securing the forward edge of the door, neither can the adjoining edges of the sections 1 and 2 be moved out, for the reason that the adjoining edges of the extensions 3 and 4 contact with each other by reason of their angular inclination with reference to the sections 1 and 2. Therefore, the first operation to open the door would, necessarily, be to turn the extension 3 outward on its hinges to a position where it will stand substantially parallel with the section 1, as in Fig. 2. This first movement can be accomplished by grasping the handle 14, or 15, and then pulling, or pushing, outward. The act of moving outward the extension 3 will also exert an outward pressure on the adjoining portions of the sections causing them to turn and bow outward with relation to each other, and as this movement is continued the forward edge of section 2 will be withdrawn from engagement with the clip 12, or the channel of the post D. Then continuing this operation the outer face of section 1 will finally contact with the face of the side C, and the inner face of section 2 will contact with the inner face of section 1, thereby eventuating in folding the door back entirely out of the way. To close the door the reverse operation is performed.

It should be noticed that when the device is folded back out of operative position that the windows I, H and E are located opposite to and in alinement with each other, by which an unobstructed view may be had through the windows from inside the vehicle.

In practice a strip, triangular in cross-section, may be attached near the edge of the inner face of the post or front D, and the forward edge of the door may be beveled to engage therewith, all substantially as shown in Fig. 4.

It is to be understood that various changes may be made in the details of construction and in the form of the several parts without departing from the spirit of my invention or sacrificing any of the principles thereof.

Having now fully shown and described my invention and one manner for its application and operation, what I claim and desire to secure by Letters Patent of the United States, is—

1. A vehicle door divided vertically into two sections hinged together, one of said sections being hinged to the side of the door opening and adapted to swing outwardly, the other section being adapted to swing inward with relation to the other section, the lower portion of each section being disposed at an angle with relation to the upper portion of the section the lower angular portion of one section being rigidly connected to the upper section, and the lower angular portion of the other section being pivotally connected to the upper section, and means for normally causing the lower portion of the last named section to remain in alinement with the lower portion of the rigid section.

2. A door divided into sections, an extension rigidly connected to one of said sections and disposed at an angle with relation thereto, an extension hinged to another of said sections and adapted to be disposed in alinement therewith or to be moved to various angles of inclination, and means for normally causing the second named extension to remain in alinement with the first named extension.

3. A vehicle door comprising vertically arranged sections, vertically arranged hinges connecting the sections together, vertically arranged hinges connecting the door to one side of a door opening, an angularly disposed extension rigidly connected to certain of the sections, a pivoted extension connected to certain other of the sections, said pivoted extension being mounted by horizontally arranged hinges, and means for normally retaining the pivoted extension in alinement with the rigid extension.

4. That improvement in vehicle doors which comprises a door divided vertically into two substantially equal sections, the upper portion of one of said sections being substantially vertical and the lower portion thereof being rigidly connected and disposed at an angle with relation thereto, the upper portion of the other section being also substantially vertical but with the lower portion thereof pivoted thereto and adapted to assume the same or an opposite angle to that of the lower portion of first named section.

5. A folding vehicle door divided vertically into substantially equal sections, the lower portion of one of said sections being disposed at a predetermined permanent angle, the lower portion of the other section being hinged whereby it may normally be disposed at the same angle as is the lower portion of the first named section either when the door is folded or opened out, and a spring for normally retaining the said hinged portion in operative position.

6. A vehicle door divided vertically into two substantially equal sections hinged together and to the side of a door opening, a clip secured to the side of the door opening opposite to the side to which the sections are hinged and adapted to receive the free edge of the door when the door is in operative position, the lower portion of one of the sections being disposed at a fixed angle and formed integral therewith, the corresponding lower portion of the other section being hinged and adapted to swing into alinement with the rigid extension, or parallel therewith, or into alinement with the upper portion of the door, and means whereby said lower hinged portion may be operated, substantially as set forth.

In testimony whereof I have hereunto subscribed my name to this specification in the presence of two subscribing witnesses.

GEORGE E. SEIDEL.

Witnesses:
EARL E. THOMAS,
R. W. RANDLE.